United States Patent
Knott

[11] 3,815,454
[45] June 11, 1974

[54] TOOL POSTS

[76] Inventor: Allan William Knott, 107 Salehurst Rd., London, England

[22] Filed: Apr. 12, 1973

[21] Appl. No.: 350,397

[30] Foreign Application Priority Data
Apr. 14, 1972 Great Britain.................. 17290/72

[52] U.S. Cl........................... 82/36 R, 29/96, 29/98
[51] Int. Cl.......................... B23b 29/00, B26d 1/00
[58] Field of Search........... 82/36, 37; 29/96, 98, 97

[56] References Cited
UNITED STATES PATENTS

| 829,081 | 8/1906 | Moras | 29/96 |
|---|---|---|---|
| 2,293,006 | 8/1942 | Luers | 29/96 |
| 2,377,519 | 6/1945 | Rich | 29/96 |
| 2,475,049 | 7/1949 | Premo | 82/36 |
| 2,780,857 | 2/1957 | Twamley | 29/96 |
| 2,930,111 | 3/1960 | St. Clair | 29/96 |
| 3,260,141 | 7/1966 | Jeanneret | 82/36 |

*Primary Examiner*—Harrison L. Hinson
*Attorney, Agent, or Firm*—Zachary T. Wobensmith, 2nd

[57] ABSTRACT

The invention described herein relates to a tool post for a lathe comprising one or more pairs of locating stations. The locating stations in a pair are inclined to each other and disposed in a common plane and means are included for mounting the tool post upon a lathe. In use, when a tool or tool holder is located in one of the stations in a pair, it is disposed in the said common plane.

5 Claims, 4 Drawing Figures

TOOL POSTS

The invention relates to a tool post for a lathe.

According to this invention a tool post for a lathe comprises one or more pairs of locating stations, the locating stations in a pair being inclined to each other and disposed in a common plane and means for mounting the tool post upon a lathe, the arrangement being such that, in use, when a tool or tool holder is located in one of the stations in a pair, it is disposed in the said common plane.

Preferably, the arrangement is such that, in use, a central axis bisecting the angle between the locating stations in a pair coincides with the centre height of the lathe spindle.

In one embodiment the locating stations in a pair comprise the two walls of a divergent channel formed in a side wall of the tool post. When the tool post is mounted upon a lathe the channel is divergent toward the lathe spindle.

The two locating stations of a pair correspond to the two directions of rotation of the spindle and if it is desired to reverse the direction of rotation, the tool or tool holder is transferred from one locating station in a pair to the other.

Preferably, there are two pairs of locating stations, one pair for use when the tool post is mounted in front of the spindle and the other for use when it is mounted to the rear of the spindle, each comprising the two walls of a divergent channel, formed in corresponding positions in opposing side walls of the tool post.

An embodiment of the invention will now be described by way of example with reference to the accompanying drawings, of which:

Figure 1:
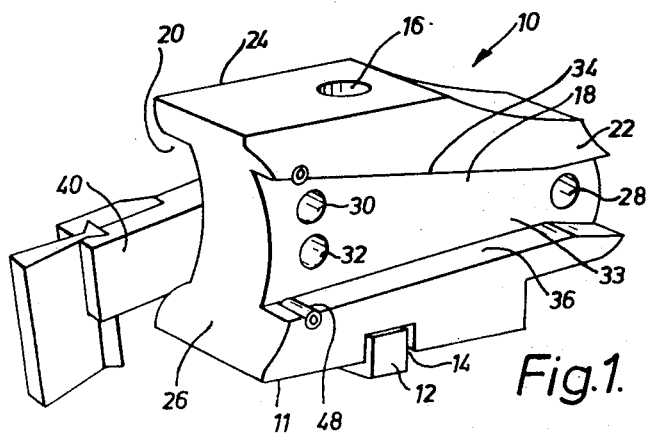
FIG. 1 is a perspective view of a tool post according to this invention.

The tool post 10 shown in FIG. 1 is specially designed for use with automatic bar lathes and is adapted for mounting upon the saddle of a lathe by means of a block 12 secured in a transverse groove 14 formed in the base 11 of the tool post 10. A hole (not shown) through the block 12 communicates with a hole 16 through the tool post and the tool post is clamped to the saddle by a T-bolt (not shown) located in a groove in the saddle and passing through the hole 16. The block 12 projects beneath the tool post and is received by the groove in the saddle. A central cylindrical portion of the block 12 coaxial with the hole through the block 12 engages in an enlarged cylindrical portion of the groove and since the groove is wider than the block 12, it is possible to angularly displace the block relative to the groove 14 about the axis of the hole 16 thereby to correctly align the tool post. The block 12 is retained in a desired position relative to the groove 14 by two screws, one on each side of the central cylindrical portion.

The tool post 10 is formed with two channels 18 and 20 extending in a direction which in use is perpendicular to the axis of rotation of the spindle of the lathe. The channels 18 and 20 are formed respectively in opposite side faces 22 and 24 and such that the height above the base 11 of a centre line of each channel is the same. Each channel is divergent toward an end 26 of the tool post, which, in use, faces toward the axis of the spindle and which is formed with a concave radius corresponding to the external diameter of a chuck or collet attached to the spindle.

Three tapped holes 28, 30 and 32 are formed transversely through the tool post 10 from the floor 33 of channel 18 to a corresponding position in the floor of channel 20. The centres of the three holes 28, 30 and 32 are arranged at the corners of an isosceles triangle; the lines joining the centres of holes 28 and 30 and 28 and 32 being respectively parallel to and equidistant from the upper 34 and lower 36 wall of the divergent channels.

The angle of divergence of the channel is determined according to a desired front clearance angle for the cutting tool and this will be described later.

A tool holder 40 is clamped to the tool post 10 by means of screws or bolts passing through elongate clearance holes 42 and 44 in the shank 46 of the tool holder 40 and into tapped holes 28 and 30 respectively. The elongate holes 42 and 44 permit adjustment of the tool mounting position to compensate, for example, for wear in the lathe feed mechanisms.

The shank 46 of the tool holder is located against the floor of a channel and against one of the walls of the channel. In FIG. 1 the shank is clamped in channel 20 and rests against the lower wall 36 thereof.

In use, dirt, swarf and grease accumulates in the channels 18 and 20 and this gives rise to inaccurate location of the tool. In order to avoid this, hardened tubular inserts 48 are fitted in passages, each having an opening extending axially of the passage, through which a circumferential portion of the tubular insert 48 extends into the channel at the end 26 to provide a small clearance between the tool shank 46 and the wall.

Figure 2:
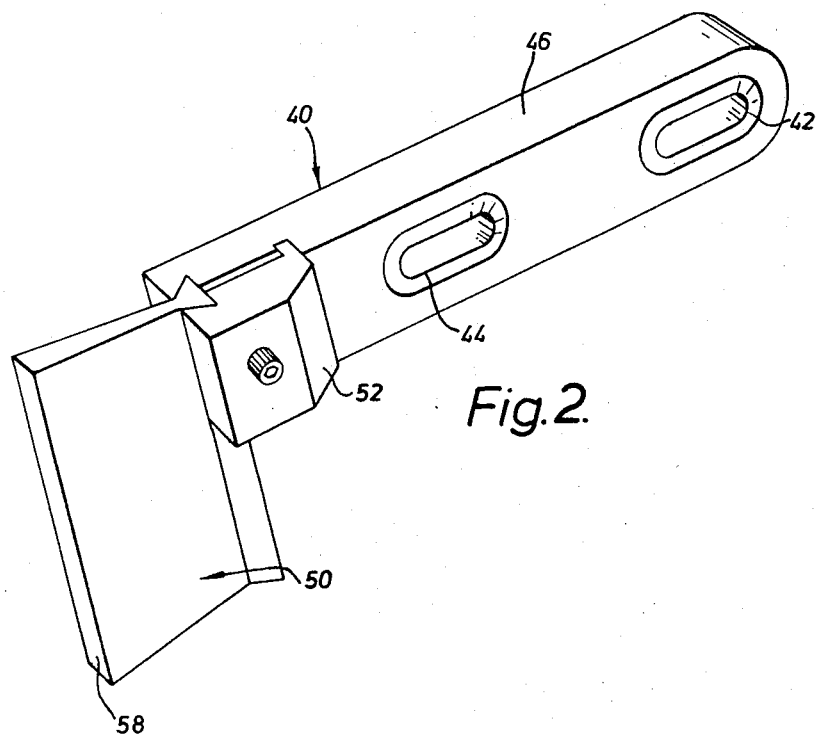
FIG. 2 is a perspective view of a tool holder.

The tool holder 40 shown in FIG. 2 has a cutting tip or insert 50 clamped in a dovetail between a block 52 and the tool shank 46. One advantage of this type of tool is that the relative position of the tip or insert 50 and the shank can be adjusted to set the tip or insert to the centre height of the lathe. However, when it is necessary to sharpen the tip or insert, care must be taken to correctly grind the tip to produce the desired top rake and front clearance.

In this case, the tip or insert 50 is parallel ground and is in the shape of a rhombus so that when tip or insert 50 is clamped in the tool holder the leading edge 58 of the tip is perpendicular to the longitudinal axis of the tool shank, the front clearance being set when the tool holder is clamped to the tool post and located against one of the walls of a divergent channel. The angle of the walls 34 and 36 to the horizontal is preferably + or − 6° respectively to give a front clearance angle of 6°. To sharpen the tip or insert 50 it is merely necessary to grind the top of the tool to produce a desired rake angle.

Figure 3:
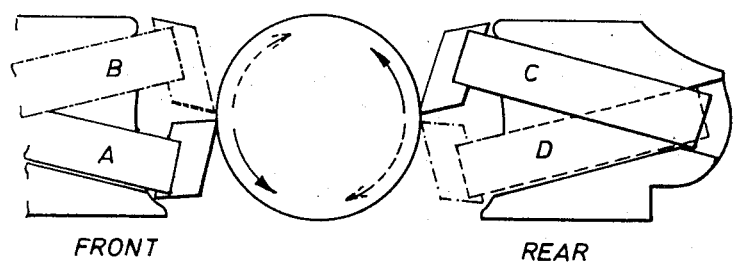
FIG. 3 shows schematically four tool mounting positions for the tool post of FIG. 1.

The tool post 10 may be mounted to the left or to the right of the lathe spindle when viewed along the axis of the spindle as indicated in FIG. 3. In an ordinary turret lathe the above positions are referred to respectively as 'front' and 'rear', considered relative to the location of the machine controls.

The tool post 10 is adapted to hold a tool in any one of four mounting positions indicated at A, B, C and D in FIG. 3. A and B are front positions and C and D are rear positions. In positions A and C (shown in full) the spindle rotates in a forward direction and in positions B and D (shown dotted) the spindle rotates in a reverse direction.

The tool post 10 is adapted to hold a tool in any one of the four positions A, B, C and D. In FIG. 1 the tool holder is clamped to the tool post in a position corresponding to position A in FIG. 3. To change the tool holding position from A to B the screw or bolt (not shown) is removed from the tapped hole 30, the tool holder is angularly displaced and located against the upper wall 34 and tubular insert 48 and the screw or bolt screwed into the tapped hole 32. The tip or insert 50 is removed from the tool holder and replaced with the point at the tool at the centre height of the lathe but downwardly facing.

With the tool holder and tip or insert 50 in either of the positions A and B the saddle may be moved to bring the tool post to the position shown in FIG. 3 wherein the concave end surface 26 is adjacent the peripheral surface of the rotating spindle and an inside surface 59 of the tool shank adjacent an end face of the rotating spindle.

Figure 4:
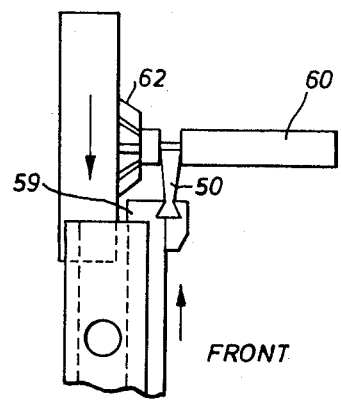
FIG. 4 shows a parting tool mounted in a tool post according to this invention during parting-off a machined component.

In the drawings the cutting tip or insert 50 is a parting tool and with the tool in the position shown in FIG. 4 it is possible to part-off a machined component 60 close to the collet 62.

To change the tool holding position from A to C or D the tool holder is removed from channel 18 and clamped by screws in holes 28 and 30 or 28 and 32 respectively against the upper 34 or lower 36 wall of the channel 20. The tip or insert is then respectively set in a downwardly or upwardly facing position as required. The inside surface 59 is normally located against the floor 34 of the divergent channel in order that the block 52 is on a side of the tool holder remote from the spindle but this is not essential.

It will be appreciated that with tool mounting positions C and D which are rear mounting positions the tool post can be brought into a position corresponding to that shown in FIG. 4.

What I claim is:

1. Tool mounting apparatus for a lathe having a lathe spindle and a cross slide comprising
   a tool post having opposing side walls,
   each of said side walls having a channel in a corresponding position therein with upper and lower diverging boundary walls diverging toward the lathe spindle,
   the floors of the two channels being parallel and the boundary walls of each divergent channel constituting a pair of locating surfaces,
   means for securing a tool or tool holder in position with the shank of the tool or tool holder against the floor of either of the two channels and located against either of the two locating surfaces in a pair, and
   means for mounting the post on said cross-slide of a lathe such that, in use, a tool or tool holder secured in one of the said positions is substantially perpendicular to the lathe spindle.

2. Tool mounting apparatus according to claim 1 and comprising means projecting from each of the walls of the divergent channels so that when a tool or tool holder is clamped in position against one of the said locating surfaces a clearance is established between the shank of the tool or tool holder and the wall at the divergent end of the channel.

3. Tool mounting apparatus according to claim 2, wherein said projecting means comprises a hardened tubular insert fitted in a passage having an opening extending axially of the passage through which a circumferential portion of the tubular insert extends into the channel.

4. Tool mounting apparatus according to claim 1 wherein the means for securing a tool or tool holder in position comprises three tapped holes formed in the floor of the channel and disposed at the apices of an ososceles triangle, the base of which is adjacent the divergent end of the channel and the sides of which are parallel to and equidistant from the respective wall of the channel.

5. Tool mounting apparatus according to claim 1 wherein the mounting means comprises
   in the base of the tool post, a groove extending transversely to the said common plane, the tool post having a central bolt hole communicating with an enlarged cylindrical portion of the groove co-axial with the bolt hole,
   a block having a central cylindrical bush fitted in the enlarged cylindrical portion of the groove, the remainder of the block being narrower than the groove, and
   means for retaining the block in a desired angular position relative to the groove.

* * * * *